US008493759B2

(12) United States Patent
Viitanen et al.

(10) Patent No.: US 8,493,759 B2
(45) Date of Patent: Jul. 23, 2013

(54) INVERTER

(75) Inventors: Tero Viitanen, Vantaa (FI); Jussi Suortti, Helsinki (FI); Matti Jussila, Vantaa (FI)

(73) Assignee: ABB Oy, Helsinki (FI)

( * ) Notice: Subject to any disclaimer, the term of this patent is extended or adjusted under 35 U.S.C. 154(b) by 335 days.

(21) Appl. No.: 12/890,417

(22) Filed: Sep. 24, 2010

(65) Prior Publication Data

US 2011/0074489 A1 Mar. 31, 2011

(30) Foreign Application Priority Data

Sep. 28, 2009 (EP) .................................... 09171446

(51) Int. Cl.
*H02M 3/24* (2006.01)
(52) U.S. Cl.
USPC .............................. 363/98; 363/95
(58) Field of Classification Search
USPC ..... 363/56.05, 95–98, 131–133, 141; 327/77, 327/109, 379, 427
See application file for complete search history.

(56) References Cited

U.S. PATENT DOCUMENTS

| 5,621,634 | A | * | 4/1997 | Sato | 363/98 |
| 6,091,049 | A | * | 7/2000 | Ikeda et al. | 219/130.21 |
| 6,147,887 | A | * | 11/2000 | Miettinen | 363/98 |
| 6,272,028 | B1 | * | 8/2001 | Satoh et al. | 363/56.05 |
| 6,353,547 | B1 | * | 3/2002 | Jang et al. | 363/132 |
| 8,040,702 | B2 | * | 10/2011 | Urakabe et al. | 363/65 |

FOREIGN PATENT DOCUMENTS

EP 0 998 018 B1 12/2003

OTHER PUBLICATIONS

Klumpner c et al. Applied power electronics conference and exposition, 2009, APEC 2009.Twenty-Fourth annual IEEE, IEEE Piscataway, NJ. USA, pp. 1773-1779, XP031442931 ISBN: 978-1-4244-2811-3.*
European Search Report dated Mar. 26, 2010.
Christian Klumpner et al., "A Cost-Effective Solution to Power the Gate Drivers of Multilevel Inverters Using the Bootstrap Power Supply Technique", Applied Power Electronics Conference and Annual IEEE, Feb. 15, 2009, pp. 1773-1779, XP-031442931.

* cited by examiner

*Primary Examiner* — Rajnikant Patel
(74) *Attorney, Agent, or Firm* — Buchanan Ingersoll & Rooney PC

(57) ABSTRACT

A two-level or multi-level inverter are supplied with a positive auxiliary voltage (Ug+) and a negative auxiliary voltage (Ug−). A bootstrap technique provides a first positive auxiliary voltage and a first negative auxiliary voltage from the supplied potentials. The bootstrap technique provides at least one additional negative auxiliary voltage to a switch driver of at least one semiconductor switch from the first negative auxiliary voltage. At the start up of an inverter, the inverter can perform a startup sequence to provide auxiliary voltages to the respective auxiliary voltage inputs of the switch drivers by turning the power semiconductors sequentially on and off.

19 Claims, 4 Drawing Sheets

INVERTER

RELATED APPLICATION

This application claims priority under 35 U.S.C. §119 to European Patent Application No. 09171446.9 filed in Europe on Sep. 28, 2009, the entire content of which is hereby incorporated by reference in its entirety.

FIELD

The present disclosure relates to inverters, such as an inverter which includes a direct voltage intermediate circuit having a positive and a negative voltage busbar, and an auxiliary voltage source.

BACKGROUND INFORMATION

A main circuit of inverters can include a direct voltage intermediate circuit and semiconductor switches connected to it, which can be FET or IGBT switches. The output stage of the inverter can be formed by a semiconductor pair connected in series between the positive and the negative voltage busbar of the intermediate circuit. The number of semiconductor pairs in the inverter can depend on the number of output phases, i.e. there is a separate output for each output phase. The semiconductor switches can be used for connecting the voltage of either the positive or the negative voltage busbar to the load connected to the output of the inverter. By connecting voltage pulses to the output the load can be provided with a specified voltage at a given time, the amplitude and frequency of which are changeable.

The semiconductor switches can be controlled by gate drivers connected to the control electrode of the semiconductor switches. Depending on the type of component employed, the control electrode can be called a gate or a base, for example. The gate drivers generate the desired current or voltage pulses for the control electrode of the semiconductor switch, and thus the switch can change over to the conducting state reliably. It can be difficult to generate the auxiliary voltage needed by the gate drivers cost-effectively since the potential of the output electrode of the power semiconductor (referred to as an upper semiconductor component herein) connected to the positive voltage busbar varies considerably as the state of the other power semiconductor changes. The output electrode is called, for example, an emitter or a source, where the name can vary according to the type of component. Positive turn-on voltage of the upper semiconductor component can be generated using a method known as a bootstrap method, in which positive turn-on voltage is produced from the positive voltage referenced to the negative voltage busbar. For example, positive turn-on voltage can be produced from voltage of a certain magnitude with respect to the negative voltage busbar of the intermediate circuit. In the bootstrap method the upper gate driver receives positive auxiliary voltage through the diode connected to the gate driver when the power semiconductor connected to the negative voltage busbar is in the conducting state. This way it is possible to generate the positive auxiliary voltage for the gate driver and used for igniting the switching component. In low-current power semiconductors, the switching component has been turned off by connecting the gate to the emitter potential of the component through the base resistance.

If the power semiconductor is intended for high currents, the gate driver should be able to generate a turn-off voltage which is negative with respect to the emitter of the semiconductor. When negative turn-off voltage is used, the component can be made to cut off the passing current quicker. Furthermore, by keeping the gate in the negative potential with respect to the emitter it is possible to prevent unintentional turn-on of the component, which could otherwise be caused by high change rates of the voltage over the component. Changes of the voltage over the component result from state changes of other power semiconductors. In the case of the IGBT, turn-on caused by voltage changes results from rapid change of the internal gate charge due to the influence of the Miller capacitance. Such unintentional turn-on lasts only for a few dozen nanoseconds during which a high current peak passes through the component, which leads to increased power loss in the power switch. To prevent this phenomenon, the gate of the component should be kept in a negative potential of at least about 5 volts with respect to the emitter when the component is off.

U.S. Pat. No. 6,147,887 discloses an inverter wherein a negative auxiliary voltage is generated for the gate driver of the power semiconductor connected to the positive voltage busbar of the intermediate circuit by the bootstrap method using negative voltage referenced to the positive current busbar and a diode connected to it. As a result, the upper power semiconductor can be switched off and kept switched off by using a gate voltage which is negative with respect to the emitter. This decreases component costs compared to other solutions because only one secondary winding of the power supply transformer is used to generate a negative direct voltage with respect to the positive voltage busbar of the intermediate circuit, and one diode per each output phase of the inverter.

SUMMARY

A method is disclosed for controlling series-connected semiconductor switches. The method comprises providing a first positive auxiliary voltage referenced to a negative voltage busbar; providing a first negative auxiliary voltage referenced to a positive voltage busbar; providing from said first positive auxiliary voltage a bootstrapped second positive auxiliary voltage to a first switch driver of a first semiconductor switch, said bootstrapped second positive auxiliary voltage being referenced to a common potential of the first switch driver; providing, with a bootstrap technique, from the first negative auxiliary voltage a bootstrapped second negative auxiliary voltage to a second switch driver of a second semiconductor switch, said bootstrapped second negative voltage being referenced to a common potential of the second switch driver; and providing, with a bootstrap technique, from the bootstrapped second negative auxiliary voltage a bootstrapped third negative auxiliary voltage to a third switch driver of a third semiconductor switch, said third negative auxiliary voltage being referenced to the common potential point of the third switch driver.

An inverter is disclosed that comprises a direct voltage intermediate circuit including a positive and a negative voltage busbar; a supply of a first positive auxiliary voltage referenced to the negative voltage busbar; a supply of a first negative auxiliary voltage referenced to the positive voltage busbar; a plurality of controllable power semiconductor switches operationally connected in series between the positive and negative voltage busbars; and a control circuit arranged to control the series-connected semiconductor switches, said control circuit comprising: a first bootstrap circuit configured to provide from said first positive auxiliary voltage supply a second positive auxiliary voltage to a first switch driver of a first semiconductor switch, said second positive auxiliary voltage being referenced to a common potential of the first switch driver; a second bootstrap circuit configured to provide from the first negative auxiliary voltage supply a second negative auxiliary voltage to a second switch driver of a second semiconductor switch, said second negative voltage being referenced to a common potential of the second switch driver; and a third bootstrap circuit configured to provide from the second negative auxiliary voltage supply a third negative auxiliary voltage to a third switch driver of a third semiconductor switch, said third negative auxiliary voltage being referenced to a common potential point of the third switch driver.

A control circuit arranged to control series connected semiconductor switches is disclosed. The control circuit comprises a first bootstrap circuit configured to provide from a first negative auxiliary voltage supply a second negative auxiliary to a first switch driver of a first semiconductor switch; and a second bootstrap circuit configured to provide from the second negative auxiliary voltage supply a third negative auxiliary voltage to a second switch driver of a second semiconductor switch, said second negative auxiliary voltage is referenced to a common potential of the second switch driver.

BRIEF DESCRIPTION OF THE DRAWINGS

The exemplary embodiments of the disclosure will be described more closely with reference to the accompanying drawings, in which.

DETAILED DESCRIPTION

An inverter according to exemplary embodiments disclosed herein provides a novel bootstrap technique for controlling a two-level or multi-level inverter. A bootstrap technique can be utilized to provide at least one further bootstrapped negative auxiliary voltage to a switch driver of at least one semiconductor switch from at least one bootstrapped negative auxiliary voltage already formed by the bootstrap technique, the further bootstrapped negative auxiliary voltage being referenced to the common potential of the respective switch driver. The new bootstrap structure enables the generation of both the positive auxiliary voltage and the negative auxiliary voltage for the switch drivers of the power semiconductors.

At the start up of an inverter, the inverter can be configured to perform a startup sequence to provide auxiliary voltages to the auxiliary voltage inputs of the switch drivers by turning the power semiconductors sequentially on and off. As disclosed herein, a supply of an auxiliary voltage whose potential is more negative than that of the negative current busbar can be avoided. As a result, one secondary winding of the power supply transformer can avoided. Thus, the exemplary embodiments can decrease component costs compared to known solutions. In a multi-level inverter, a specified number of auxiliary voltages for the switch drivers of the semiconductor switches can be provided with a smaller number of supplied auxiliary voltages.

Figure 1:
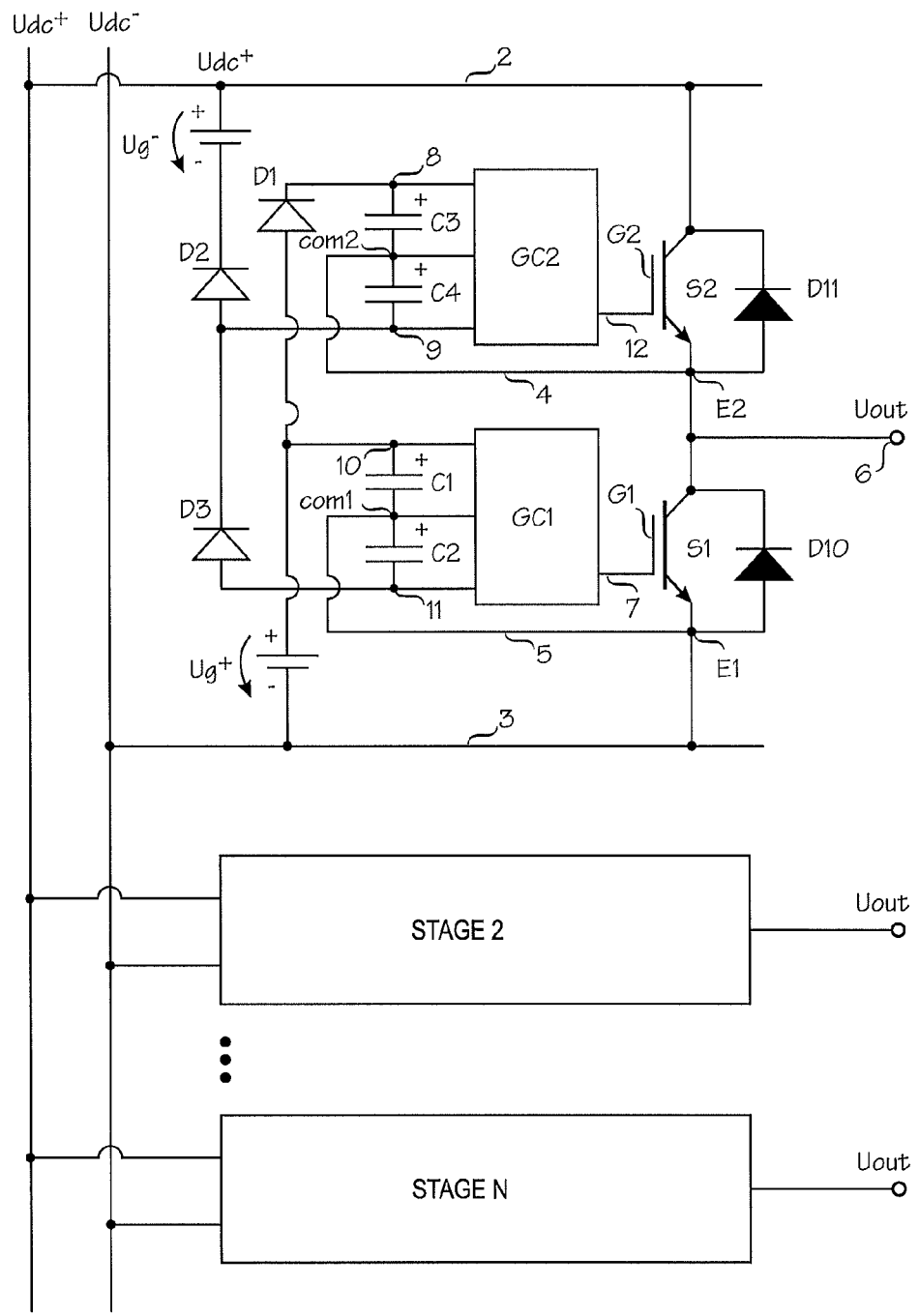
FIG. 1 schematically illustrates an output stage of a dual-level inverter according to an exemplary embodiment.

Referring to FIG. 1, an inverter of an exemplary embodiment 1 comprises a voltage intermediate circuit including a positive voltage busbar 2 supplying a dc voltage Udc+, and a negative voltage busbar 3 supplying a dc voltage Udc−. Voltages Udc+ and Udc− can be generated in the busbars 2 and 3, for example, by rectifying the alternating voltage of an electric supply network. FIG. 1 illustrates only one of the possible output stages of the inverter which can include any number N of output stages (N=1, 2, 3, . . . ). All output stages can be similar to one another, and in the most cases there are three output stages. Thus the inverter can be used for producing a 3-phase output voltage the amplitude and frequency of which can be changed as desired. There can also be more than one output stage for a single phase. The number of output stages can vary from one phase to another. Further, only one or some of the phases can be provided with an output stage according to the invention, while the remaining phases are not.

The output voltage Uout is generated at an output 6 through power semiconductors S1 and S2, such as an IGBT. The voltage Udc− of the negative voltage busbar 3 and the voltage Udc+ of the positive voltage busbar 2 are alternately supplied to the output 6 using semiconductor components S1 and S2 connected in series with each other between the busbars 2 and 3. Also respective anti-parallel diodes D10 and D11 are connected in series with each other between the busbars 2 and 3. In the exemplary embodiments, the semiconductor components S1 and S2 are IGBT switches, and thus the control electrodes G1, G2 of the switches are called gates and the output electrodes E1, E2 emitters.

However, it should be appreciated that the exemplary embodiments are not restricted to the use of IGBT switches but any type of semiconductor power switches, such as MOSFET, JFET, GTO can be employed. Any suitable semiconductor manufacturing technique, such as silicon and silicon carbide, can be employed. It should be appreciated that the names of the terminals of the semiconductor switches can differ from one type of switch to another, for example, gate/base, drain/emitter, and source/collector. The output voltage Uout is alternately equal to the voltage Udc+ of the positive voltage busbar 2 (a first output voltage level) and the voltage Udc− of the negative voltage busbar 3 (a second output voltage level) as a result of the switching operation.

In an inverter according to an exemplary embodiment, auxiliary voltages Ug+ and Ug− referenced to the positive and the negative voltage busbars 2 and 3 of the inverter are provided. The auxiliary voltage Ug+ is referenced to the negative voltage busbar 3 so that the first auxiliary voltage Ug+ is positive with respect to the voltage Udc−. The difference in potential between the auxiliary voltage Ug+ and the voltage busbar Udc− can be, for example, about 10 to 20 volts. The second auxiliary voltage Ug− is referenced to the positive voltage busbar 2. The auxiliary voltage Ug− is negative with respect to the voltage Udc+. The difference in potential can be, for example, about −5 to −10 volts. The voltages Ug+ and Ug− can be provided with any suitable means, for example, from one or more voltage sources, which illustrated by the schematic voltage source symbols in FIGS. 1 to 4.

In the illustrated example, the emitters E1, E2 of the switches S1, S2 are connected to the common node Com1, Com2 of the gate drivers GC1, GC2 by auxiliary emitter couplings 5 and 4, respectively. The common node Com1 is a connection node between series connected capacitors C1 and C2, and the common node Com2 is a connection node between series connected capacitors C3 and C4.

A purpose of auxiliary voltages Ug+ and Ug− is to produce auxiliary voltages for the gate drivers GC1 and GC2 so that semiconductor components S1 and S2 can be reliably controlled. The gate drivers GC1 and GC2 can be provided with optoisolation. Inside each gate driver a low-level control signal (not shown) can be converted into an optical signal (light), which can be converted into a higher-level voltage output which controls the switches S1, S2 and for which the auxiliary voltages are needed.

In the illustrated example embodiment, all positive and negative control voltages for gate drivers GC1 and GC2 are derived from the two auxiliary voltages Ug+ and Ug− by a bootstrap method. In the embodiment of FIG. 1, a first diode D1 is connected between the auxiliary voltage Ug+ and a positive input 8 of the gate driver GC2, for example, the upper gate driver. A purpose of the diode D1 is to produce positive voltage for the gate driver GC2 with respect to the potential of the common node Com1, when the lower semiconductor switch S1 is in the conducting state. Furthermore, diode D1 decouples GC2 from the auxiliary voltage Ug+, when S1 or it's antiparallel diode D10 is not conducting, for example, when S2 is conducting.

A diode D2 is connected between the auxiliary voltage Ug− and the negative auxiliary voltage input 9 of the gate driver GC2. A purpose of the diode D2 is to provide negative auxiliary voltage for the gate driver GC2 with respect to the potential of the common node Com2, when the upper switch S2 or it's antiparallel diode D11 is conducting.

Further, a diode D3 is connected between the input 9 of the gate driver GC2 and the input 11 of the gate driver GC1. A purpose of the diode D3 is to produce negative voltage at the input 9 of the gate driver GC1 with respect to the potential of the common node Com1, when the semiconductor switch S1 is in the conducting state and there is a charged voltage across the capacitor C4 of the gate driver GC2.

Those skilled in the art will appreciate that various additional components can be used without departing from the principles of the described embodiments. For example, serial resistors or the like can be employed with the diodes D1, D2 and D3 to limit peak currents. Therefore, the term "connected" as used herein shall be interpreted in a broad sense to include either a direct connection or an "operational connection" with an intermediate component or components. It should be appreciated that, when talking about the voltages in connection with gate control circuitry, the voltage is referred to a common potential point (Com1, Com2, Com3, Com4) of the appropriate gate control circuit (GC1, GC2, GC3, GC4). Auxiliary voltages are charged to the capacitors (C1, C2, . . . ) such that the positive auxiliary voltage is charged to C1, C3, C5 and C7, while the negative auxiliary voltage is charged to C2, C4, C6 and C8.

By this configuration, all positive and negative control voltages specified for the gate drivers GC1 and GC2 can be generated from the two auxiliary voltages Ug+ and Ug−, for example, by means for performing the following exemplary startup switching sequence before normal operation of the inverter:

| S1 | S2 | S1 |
|----|----|----|
| ON OFF | ON OFF | ON OFF |

S1 ON-S1 OFF. The gate driver GC1 is arranged to control the lower switch, i.e. the power switch S1, whose emitter E1 is connected to the potential of the negative voltage busbar 3 of the intermediate voltage circuit. The auxiliary voltage Ug+ referenced to the negative busbar 3 is present at the input 10 of the gate driver GC1. Thus, the capacitor C1 is charged to the voltage Ug+. When the semiconductor switch S1 is in a conducting state, the gate G1 of the switch S1 should be at a positive potential with respect to the emitter E1 of the switch S1. When the switch S1 is in the conducting state, the positive potential at the input 10 of the gate driver GC1 is supplied to the output 7. Because the output 7 is connected to the gate G1 of the switch S1 to be controlled, the potential difference between the gate G1 and the emitter E1 of the switch S1 is equal to the positive auxiliary voltage Ug+, since the emitter E1 is at the potential Udc−.

When the switch S1 is conductive (and S2 non-conductive), the emitter E2 of the upper power switch S2 (and the output 6) is drawn at a potential which is approximately equal to the potential Udc− (minus a possible voltage drop across S1). Due to the auxiliary emitter coupling 4, the Com2 is also at the potential of the emitter E2 (i.e. approx. Udc−). Thus, the auxiliary voltage Ug+ has a higher potential than that of the common voltage Com2, and current can pass through the forward-biased diode D1, thereby charging a capacitor C3 connected between the positive control voltage input 8 and the common node Com2 of the gate driver GC2 and producing positive voltage at the input 8 of the upper gate driver GC2. The positive voltage can be used for generating a positive potential difference between the gate G2 and the emitter E2 of the switch. Such generation of an auxiliary voltage from the auxiliary voltage referenced to one of the voltage busbars is called a bootstrap method. Next, the lower switch S1 is switched to a non-conducting state, S1 OFF.

S2 ON-S2 OFF. The upper switch is S2 switched, to the conducting state, S2 ON, as a result of the voltage across C3 to the output 12 of the gate driver GC2. When the switch S2 is conductive (and S1 non-conductive), the emitter E2 of the upper power switch S2 (and the output 6) is at a potential which is approximately equal to the potential Udc+ (minus a possible voltage drop across S2). Due to the auxiliary emitter coupling 4, the Com2 is also at the potential of the emitter E2 (i.e. approx. Udc+). Thus the potential of the Com2 is higher than that of the auxiliary potential Ug−, the diode D2 is forward-biased and the auxiliary voltage Ug− charges the capacitor C4, which is connected between the common node Com2 of the gate driver GC2 and the negative control voltage input 9. A required negative voltage is thereby provided at the input of the gate driver GC2. The gate driver GC2 uses the negative voltage for turning the switch S2 off and keeping it turned off. The switch S2 is turned off (S2 OFF state) reliably by connecting the negative voltage (Ug−), which is negative with respect to the emitter E2 (and Udc−), from the input 9 of the gate driver GC2 to the gate G2 of the switch S2.

S1 ON-S1 OFF. When the switch S1 is switched to the conducting state, S1 ON, the auxiliary voltage Ug+ in the capacitor C1 of the gate driver GC1 is supplied to the output 7 of the gate driver GC1. Because the output 7 is connected to the gate G1 of the switch S1 to be controlled and the emitter E1 is at the potential Udc−, the potential difference between the gate G1 and the emitter E1 of the switch S1 is equal to the positive auxiliary voltage Ug+. Thus, the gate G1 of the switch S1 is at a positive potential with respect to the emitter E1 of the switch S1, and S1 is turned on. Due to the auxiliary emitter coupling 5, the Com1 is also at the potential of the emitter E1 (i.e. at Udc−). Furthermore, due to the auxiliary emitter coupling 4, the positive terminal of capacitor C4 is connected to the positive terminal of the capacitor C2 through switch S1. The diode D3 is forward biased and builds a current path: Com2→S1→Com1→C2→→D3→C4. This current path discharges the voltage in capacitor C4 to capacitor C2. Thus a negative voltage is produced at the input of the lower gate driver GC1. Thus, when the switch S1 is again switched to the non-conducting state (S1-OFF), the negative voltage at the input of the gate driver GC1 is supplied to the output 7 of the gate driver GC1, and the potential of the gate G1 of switch S1 is negative with respect to the potential of the emitter E1. As a result, the switch S1 is turned off reliably.

Principles as disclosed herein can be used also for generating multiple positive and negative auxiliary voltages for multiple series-connected semiconductor power switches in a multi-level inverter.

Figure 2:
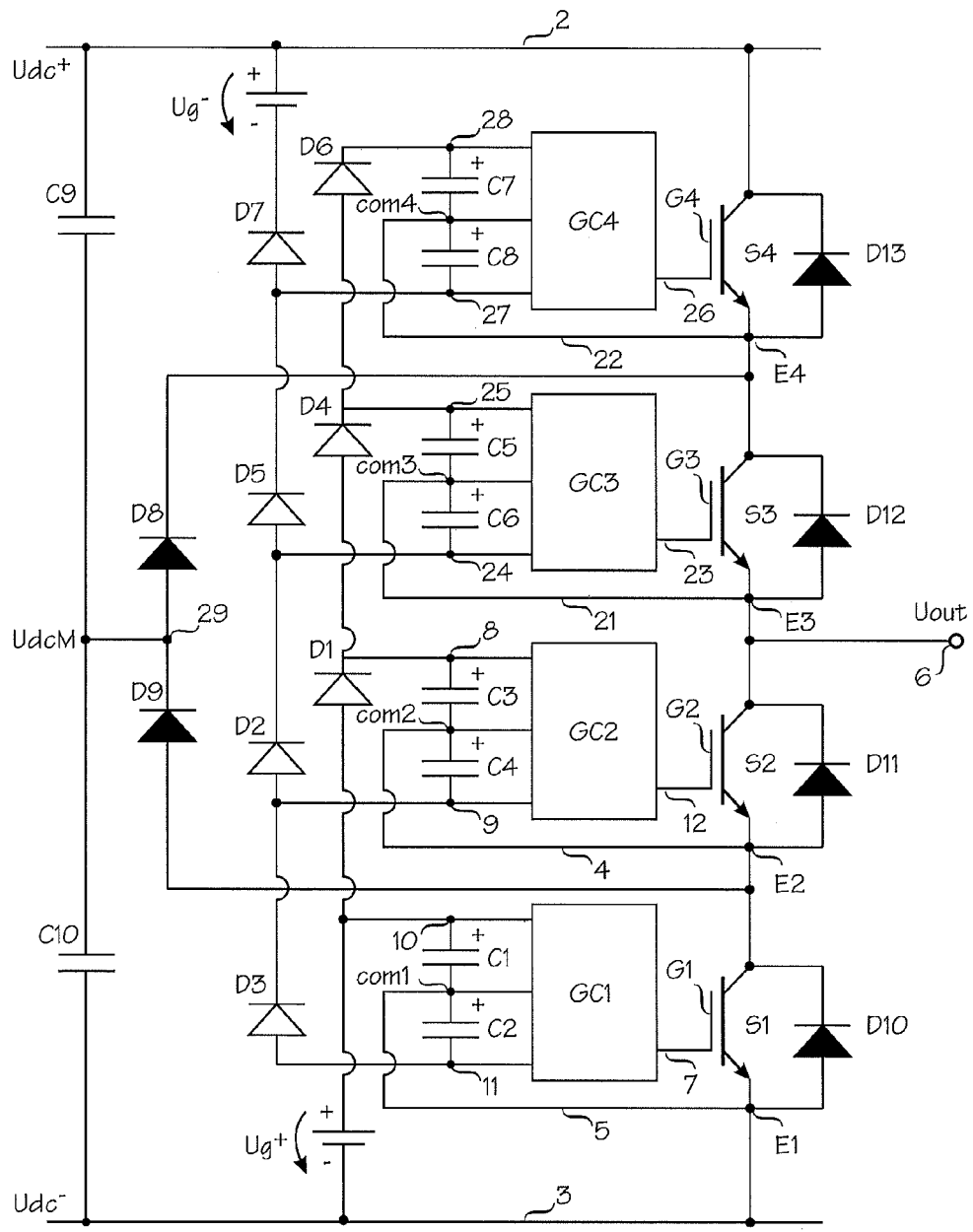
FIG. 2 schematically illustrates an output stage of a multi-level inverter according to an exemplary embodiment.

FIG. 2 schematically illustrates one output stage of a multi-level inverter according to an exemplary embodiment. FIG. 2 illustrates only one of the possible output stages of the inverter which may include any number of output stages. All output stages may be similar to one another, and there can be, for example, one to three output stages. Thus, the inverter can be used for producing a single-phase or three-phase output voltage the amplitude and frequency of which can be changed as desired.

The multi-level (3-level) inverter shown in FIG. 2 includes four power semiconductors S1, S2, S3 and S4, such as IGBT, connected in series with each other between the busbars 2 and 3, and respective anti-parallel diodes D10, D11, D12 and D13. In the exemplary embodiments, IGBT switches are used as examples of semiconductor components S1-S4, and thus the control electrodes G1-G4 of the switches are called gates and the output electrodes E1-E4 emitters. However, it should be appreciated that embodiments disclosed herein are not restricted to IGBT switches but can employ any type of semiconductor power switch.

In an inverter according to the exemplary embodiment, auxiliary voltages Ug+ and Ug– referenced to the positive and the negative voltage busbars 2 and 3 of the inverter are provided. The auxiliary voltage Ug+ is referenced to the negative voltage busbar 3 so that the first auxiliary voltage Ug+ is positive with respect to the voltage Udc–. The voltages Ug+ and Ug– may be provided as described above.

The emitters E1, E2, E3, E4 of the switches S1-S4 are connected to the common node Com1, Com2, Com3, Com4 of the gate drivers GC1, GC2, GC3, GC4 by auxiliary emitter couplings 5, 4, 21, and 22, respectively. The common node Com1 is a connection node between the series connected capacitors C1 and C2, the common node Com2 is at a connection node between series connected capacitors C3 and C4, the common node Com3 is a connection node between the series connected capacitors C5 and C6, and the common node Com4 is at a connection node between series connected capacitors C7 and C8.

Capacitors C9 and C10 are connected in series with each other between the busbars 2 and 3. Capacitors C9 and C10 are part of the typical 3-inverter structure and have no major role on the exemplary gate driver. Diodes D8 and D9 can be conducting when forward biased, however, this function is dependent on inverter operation.

In the illustrated example, all positive and negative voltages for the gate drivers GC1-GC4 are derived from auxiliary voltages Ug+ and Ug– by a bootstrap method. Similarly as in the embodiment of FIG. 1, the input 10 of the first gate driver GC1, i.e. the lowest gate driver, is connected to the auxiliary voltage Ug+ to provide the positive voltage for the first gate driver GC1 with respect to the common node Com1. A diode D1 is connected between the auxiliary voltage Ug+ and the input 8 of the gate driver GC2, i.e. the upper gate driver, to produce positive voltage for the gate driver GC2 with respect to the common node Com2.

A diode D4 is connected between the input 8 of the gate driver GC2 and the input 25 of the gate driver GC3, i.e. the second highest gate driver, to produce positive voltage for the gate driver GC3 with respect to the common node Com3.

A diode D6 is connected between the input 25 of the gate driver GC3 and the input 28 of the gate driver GC4, i.e. the highest gate driver, to produce positive voltage for the gate driver GC4 with respect to the common node Com4. Thus, the diodes D1, D4 and D6 which supply the positive auxiliary voltage Ug+ are connected in series such that the anodes thereof are arranged towards the voltage Ug+.

Further, a diode D7 is connected between the auxiliary voltage Ug– and the negative control input 27 of the gate driver GC4 to produce negative voltage for the gate driver GC4 with respect to the common node Com4.

A diode D5 is connected between the negative control input 27 of the gate driver GC4 and negative control input 24 of the gate driver GC3 to produce a negative voltage (with respect to the common node Com3) for the gate driver GC3 from the input 27 of the gate driver GC4.

A diode D2 is connected between the negative control input 24 of the gate driver GC3 and negative control input 9 of the gate driver GC2 to produce a negative voltage (with respect to the common node Com2) for the gate driver GC2 from the input 24 of the gate driver GC3.

A diode D3 is connected between the negative control input 9 of the gate driver GC2 and the negative control input 11 of the gate driver GC1 to produce a negative voltage (with respect to the common node Com1) for the gate driver GC1 from the input 9 of the gate driver GC2. Thus, the diodes D3, D2, D5 and D7 which supply the auxiliary voltage Ug– are connected in series such that the respective cathodes are arranged towards the voltage Ug–.

Those skilled in the art will appreciate that various additional components can be used without departing from the principles of the exemplary embodiment. For example, serial resistors or the like can be employed with the diodes D1 to D7 to limit peak currents. Therefore, the term "connected" as used herein shall be interpreted to include either a direct connection or an "operational connection" with an intermediate component or components.

As a result of the exemplary configuration above, which is based on series connection of multiple bootstrap circuits, all positive and negative auxiliary voltages required for the gate drivers GC1-GC4 can be generated from the two control voltages Ug+ and Ug– by means for performing the following exemplary startup switching sequence:

| S1 | S2 | S3 | S4 | S3 | S2 | S1 |
|---|---|---|---|---|---|---|
| ON OFF | ON OFF | ON OFF | ON OFF | ON OFF | ON OFF | ON OFF |

S1 ON-S1 OFF. The voltage Ug+ is constantly present at the input 10 of the gate driver GC1 and charges the capacitor C1. Common node Com1 and the emitter E1 are at the potential Udc–. When the startup sequence begins, the switch S1 is controlled in the conductive state, S1 ON, by connecting the positive voltage Ug+ from the input 10 to the output 7 of the gate driver GC1. When the switch S1 is conductive, emitter E2 of the switch S2 and the common node Com2 are at the potential Udc–. As a result, the capacitor C3 is charged to the voltage Ug+ through the forward biased diode D1, thereby providing the positive voltage to the input of the gate driver GC2. The voltage Ug+ is maintained across the capacitor C3, when the switch S1 is turned off.

S2 ON-S2 OFF. The switch S2 is switched to a conductive state, S2 ON, by connecting the positive voltage Ug+ from the input 8 to the output 12 of the gate driver GC2. When the switch S2 is conductive, emitter E3 of the switch S3 and the common node Com3 are at a potential prevailing at the emitter E2 of the switch S2 and at the common node Com2. As a consequence, the capacitor C3 and the capacitor C5 are charged to the voltage Ug+ through the forward biased diode D4, thereby providing the positive voltage at the input of the gate driver GC3. The voltage Ug+ is maintained across the capacitor C5, when the switch S2 is turned off.

S3 ON-S3 OFF. The switch S3 is switched to a conductive state, S3 ON, by connecting the positive voltage Ug+ from the input 25 to the output 23 of the gate driver GC3. When the switch S3 is conductive, emitter E4 of the switch S4 and the common node Com4 are at a potential prevailing at the emitter E3 of the switch S3 and at the common node Com3. Therefore, the capacitor C5 and the capacitor C7 are charged to the voltage Ug+ through the forward biased diode D6, thereby providing the positive voltage to the input of the gate driver GC4. The voltage Ug+ is maintained across the capacitor C7, when the switch S3 is turned off.

S4 ON-S4 OFF. The switch S4 is switched to a conductive state, S4 ON, by connecting the positive control voltage Ug+ from the input 28 to the output 26 of the gate driver GC4. When the switch S4 is conductive, emitter E4 of the switch S4 and the common node Com4 are at the potential Udc+. As a consequence, the capacitor C8 is charged to the voltage Ug- through the forward biased diode D7, thereby providing the negative control voltage to the input 27 of the gate driver GC4. The voltage Ug- is maintained across the capacitor C8, when the switch S4 is turned off.

S3 ON-S3 OFF. The switch S3 is switched to a conductive state, S3 ON, by connecting the positive voltage Ug+ from the input 25 to the output 23 of the gate driver GC3. When the switch S3 is conductive, emitter E3 of the switch S3 and the common node Com3 are drawn to the potential prevailing at the emitter E4 of the switch S4 and at the common node Com4. As a result, the voltage Ug- is discharged from the capacitor C8 to the capacitor C6 through the forward biased diode D5, thereby providing the negative voltage to the input of the gate driver GC3. The voltage Ug- is maintained across the capacitor C6, when the switch S3 is turned off.

S2 ON-S2 OFF. The switch S2 is switched to a conductive state, S2 ON, by connecting the positive voltage Ug+ from the input 8 to the output 12 of the gate driver GC2. When the switch S2 is conductive, emitter E2 of the switch S2 and the common node Com2 at a potential prevailing at the emitter E3 of the switch S3 and at the common node Com3. As a result, the voltage Ug- is discharged from the capacitor C6 to the capacitor C4 through the forward biased diode D2, thereby providing the negative voltage to the input of the gate driver GC2. The voltage Ug- is maintained across the capacitor C4, when the switch S2 is turned off.

S1 ON-S1 OFF. The switch S1 is switched to a conductive state, S1 ON, by connecting the positive voltage Ug+ from the input 10 to the output 7 of the gate driver GC1. When the switch S1 is conductive, emitter E2 of the switch S2 and the common node Com2 are at the potential Udc-. As a result, the capacitor C2 is charged to the voltage Ug- through the forward biased diode D3, thereby providing the negative voltage to the input of the gate driver GC1. The voltage Ug- is maintained across the capacitor C2, when the switch S1 is turned off.

The illustrated exemplary startup sequence first transfers the positive voltages sequentially from the lowest bootstrap circuit to the highest bootstrap circuit, and then transfers the negative voltages sequentially from the highest bootstrap circuit to the lowest bootstrap circuit. After carrying out the startup sequence, all gate driver circuits GC1-GC4 are provided with both the positive and negative auxiliary voltages. There is a small reduction in the voltage (Ug+ or Ug-) each time the voltage is transferred to the next capacitor, due to the voltage drop across the forward biased diode and the conductive semiconductor switch. However, the reduced voltage is sufficient to turn on and off the semiconductor switch in most implementations. The negative voltage is insensitive to the variation in the voltage level, because it is used to keep the semiconductor switch in a non-conductive state, OFF, according to the control signal. For example, the gate voltage of the IGBT can vary in the range of −3 V to −10 V while maintaining the IGBT in the non-conductive state.

The variation in the level of the charged positive voltage can affect power loss in the conductive state of the semiconductor switch. Therefore, in an exemplary embodiment the voltage variation can be kept as small as possible, for example, by increasing the capacitance of the capacitors C1, C3, C5 and C7.

Figure 3:
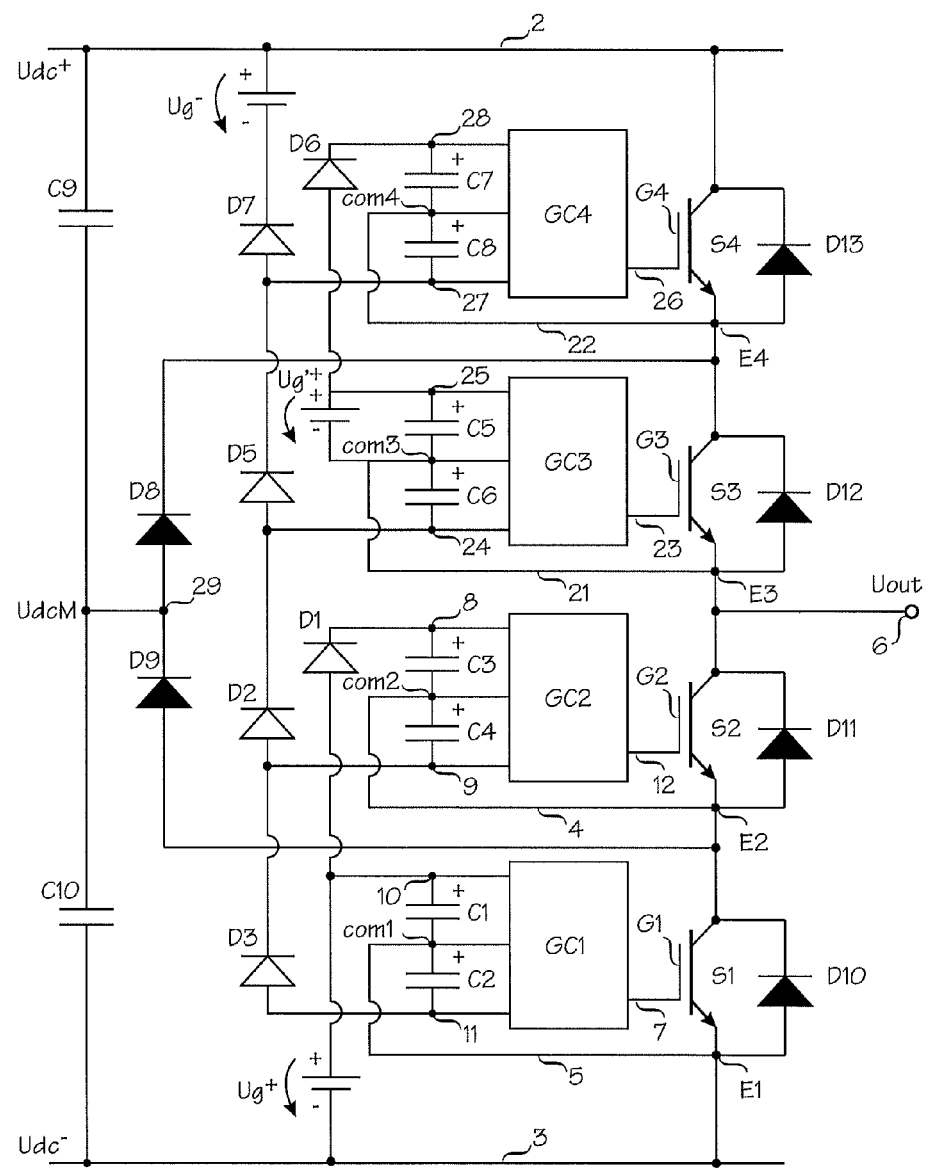
FIG. 3 schematically illustrates an output stage of a multi-level inverter according to another exemplary embodiment.

FIG. 3 schematically illustrates a single output stage of a multi-level inverter according to another exemplary embodiment. The inverter is similar to that shown in FIG. 2 except that the diode D4 is omitted, which effectively results in a breaking of the series connection of diodes D1, D4 and D6, and a disconnecting of the inputs 8 and 25 from each other. In another variation of this embodiment, the capacitor C5 can be omitted, and a positive auxiliary voltage Ug'+ of preset level applied between the input 25 and the common node Com3 of the gate driver GC3. Because Ug'+ is a stable preset voltage, variation of the positive voltage is reduced. The voltage Ug'+ can be provided in a similar manner as the auxiliary voltages in the exemplary embodiments of FIGS. 1 and 2 described above. The same reference symbols depict similar structures and functions in FIGS. 2 and 3.

The positive and negative voltages can be provided for the gate drivers GC1-GC4 using a startup sequence described above in relation to FIG. 2.

S1 ON-S1 OFF. The operation at this point in the startup sequence is similar to that described above with reference to FIG. 2.

S2 ON-S2 OFF. The operation at this point in the startup sequence is similar to that described with reference to FIG. 2 except that the voltage charged to the capacitor C3 is not transferred to the gate driver GC3. Instead, the floating voltage Ug'+ provides the positive voltage to the input of the gate driver GC3.

S3 ON-S3 OFF. The operation at this point in the startup sequence is similar to that described with reference to FIG. 2 except that, instead of discharging the voltage Ug+ from the capacitor C5 to the input 28 of the gate driver GC4, the capacitor C7 is charged to the floating voltage Ug'+ through the forward biased diode D6, thereby providing the positive voltage to the input of the gate driver GC4. The voltage Ug'+ is maintained across the capacitor C7, when the switch S3 is turned off.

The remaining phases of the startup sequence, which includes S4 ON-S4 OFF, S3 ON-S3 OFF, S2 ON-S2 OFF, and S1 ON-S1 OFF, operate in a manner similar to those described with respect to FIG. 2.

Figure 4:
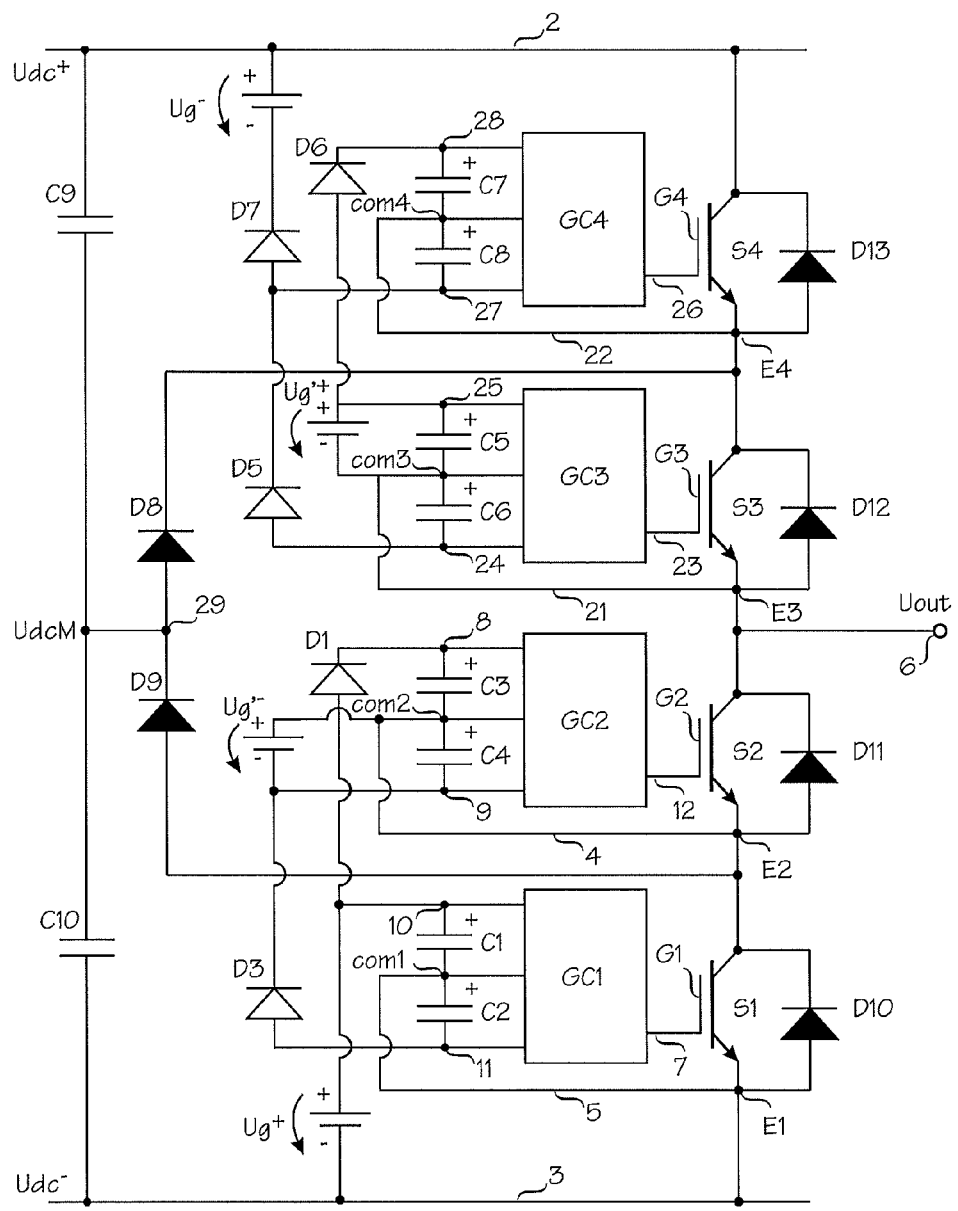
FIG. 4 schematically illustrates an output stage of a multi-level inverter according to another exemplary embodiment.

FIG. 4 schematically illustrates a single output stage of a multi-level inverter according to still another exemplary embodiment of the invention. In this embodiment, the inverter is similar in construction to that shown in FIG. 3 except that the diode D2 is also omitted. Omission of the diode D2 results in a breaking of the series connection of diodes D3, in addition to the diode D4 being omitted, D2, D5, and D7, and a disconnecting of the inputs 9 and 24 from each other. Further, a negative auxiliary voltage Ug'– of a preset level is applied between the input 9 and the common node Com2 of the gate driver GC2. As a result, variation of the negative voltage is reduced, because Ug'– is a stable preset voltage. The voltage Ug'– may be provided in a similar manner as the auxiliary voltages in the embodiments described above. The same reference symbols depict similar structures and functions in FIGS. 2, 3, and 4.

The positive and negative voltages can be provided for the gate drivers GC1-GC4 using a startup sequence described above in relation to FIGS. 2 and 3.

For the first phases of the sequence which include S1 ON-S1 OFF, S2 ON-S2 OFF, S3 ON-S3 OFF, S4 ON-S4 OFF and again S3 ON-S3 OFF, the operation is similar to the manner described above with reference to FIG. 3.

For the next phase, which includes S2 ON-S2 OFF, the operation is similar to the manner described above with reference to FIG. 2 except that the voltage charged to the capacitor C6 is not transferred to the gate driver GC2. Instead, the floating voltage Ug'– provides the negative voltage to input of the gate driver GC2.

The operation of the final phase S1 ON-S1 OFF is similar to the manner described above with reference to FIG. 2 except that the voltage Ug'– is charged or transferred to the capacitor C2 at the input 11 of the gate driver GC1.

The embodiments described herein are exemplary embodiments of the invention. It will be readily apparent to those skilled in the art that still further changes and modifications in the actual concepts described herein can be readily made without departing from the spirit and scope of the invention as defined by the attached claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for controlling series-connected semiconductor switches, comprising:
providing a first positive auxiliary voltage referenced to a negative voltage busbar;
providing a first negative auxiliary voltage referenced to a positive voltage busbar;
providing from said first positive auxiliary voltage a second positive auxiliary voltage to a first switch driver of a first semiconductor switch, said second positive auxiliary voltage being referenced to a common potential of the first switch driver;
providing, with a bootstrap technique, from the first negative auxiliary voltage a second negative auxiliary voltage to a second switch driver of a second semiconductor switch, said second negative auxiliary voltage being referenced to a common potential of the second switch driver; and
providing, with a bootstrap technique, from the second negative auxiliary voltage a third negative auxiliary voltage to a third switch driver of a third semiconductor switch, said third negative auxiliary voltage being referenced to a common potential point of the third switch driver.

2. An inverter comprising:
a direct voltage intermediate circuit including a positive and a negative voltage busbar;
a supply of a first positive auxiliary voltage referenced to the negative voltage busbar;
a supply of a first negative auxiliary voltage referenced to the positive voltage busbar;
a plurality of controllable power semiconductor switches operationally connected in series between the positive and negative voltage busbars; and
a control circuit arranged to control the series-connected semiconductor switches, said control circuit comprising:
a first bootstrap circuit configured to provide from said first positive auxiliary voltage supply a second positive auxiliary voltage to a first switch driver of a first semiconductor switch, said second positive auxiliary voltage being referenced to a common potential of the first switch driver;
a second bootstrap circuit configured to provide from the first negative auxiliary voltage supply a second negative auxiliary voltage to a second switch driver of a second semiconductor switch, said second negative voltage being referenced to a common potential of the second switch driver; and
a third bootstrap circuit configured to provide from the second negative auxiliary voltage supply a third negative auxiliary voltage to a third switch driver of a third semiconductor switch, said third negative auxiliary voltage being referenced to a common potential point of the third switch driver.

3. The inverter according to claim 2, wherein said plurality of semiconductor switches comprises upper and a lower controllable power semiconductor switches, which are operationally connected in series between the positive and the negative voltage busbar, wherein a point between the semiconductors switches forms a phase output of the inverter, and wherein said control circuit comprises:
upper and lower switch drivers configured to provide output voltages to a control electrode of respective upper and lower power semiconductor switches, each output voltage being referenced to an output electrode of the power semiconductor switch to be controlled, and each switch driver including respective positive and negative auxiliary voltage inputs and a respective common potential point;
wherein the first positive auxiliary voltage is referenced to the negative voltage busbar and is provided at the positive auxiliary voltage input of the lower switch driver that is referenced to respective common potential point of the lower switch driver;
wherein the first bootstrap circuit is configured to provide, from said first positive auxiliary voltage, a second positive auxiliary voltage to the respective positive auxiliary voltage input of the upper switch driver, said second positive auxiliary voltage is referenced to the respective common potential point of the upper switch driver;
wherein the second bootstrap circuit is configured to provide, from the first negative auxiliary voltage, a second negative auxiliary voltage to the respective negative auxiliary voltage input of the upper switch driver, said second negative voltage is referenced to the respective common potential point of the upper switch driver; and wherein the third bootstrap circuit is configured to provide, from the second negative auxiliary voltage of the upper switch driver, a third negative auxiliary voltage to the respective negative voltage input of the lower switch driver, said third negative auxiliary voltage is referenced to the respective common potential point of the lower switch driver.

4. The inverter according to claim 3, wherein the inverter is configured to perform a startup sequence to provide auxiliary voltages to the respective positive and negative auxiliary voltage inputs of the switch drivers by turning the power semiconductor switches sequentially on and off in the following order: a lower semiconductor switch, an upper semiconductor switch, and again the lower semiconductor switch.

5. The inverter according to claim 2, wherein:
the first bootstrap circuit comprises a first diode having an anode that is operationally connected to the first positive auxiliary voltage supply referenced to the negative voltage busbar, and a cathode that is operationally connected to the respective positive auxiliary voltage input of an upper switch driver;
the second bootstrap circuit comprises a second diode having an anode that is operationally connected to the respective negative auxiliary voltage input of the upper switch driver, and a cathode that is operationally connected to the first negative auxiliary voltage referenced to the positive busbar; and
the third bootstrap circuit comprises a third diode having an anode that is operationally connected to the respective negative auxiliary voltage input of the lower switch driver, and the cathode of which is operationally to the respective negative auxiliary voltage input of the upper switch driver.

6. The inverter according to claim 2, wherein the plurality of semiconductor switches comprises at least three or more semiconductor switches, which are connected in series between the positive and the negative voltage busbar, wherein a node between two of the semiconductor switches forms a phase output of the inverter, and wherein the control circuit comprises:
a plurality of switch drivers, one for each of the power semiconductor switches, configured to provide output voltages to a control electrode of a respective power semiconductor, wherein each output voltage is referenced to an output electrode of a respective power semiconductor switch to be controlled, and each switch driver comprising respective positive and negative auxiliary voltage inputs, and a respective common potential point;
wherein the first positive auxiliary voltage is provided at the respective positive auxiliary voltage input of a lowest switch driver that is referenced to the respective common potential point of the lowest switch driver;
wherein the first bootstrap circuitry is configured to provide, from said first positive auxiliary voltage, a second positive auxiliary voltage to the respective positive auxiliary voltage input of an upper switch driver, the second positive auxiliary voltage being referenced to the respective common potential point of the upper switch driver;
wherein the second bootstrap circuit is configured to provide, from the first negative auxiliary voltage, a second negative auxiliary voltage to the respective negative auxiliary voltage input of an upmost switch driver, said second positive auxiliary voltage being referenced to the respective common potential point of the upmost switch driver;

wherein the third bootstrap circuit is configured to provide, from the second negative auxiliary voltage of the upmost switch driver a third negative auxiliary voltage to the respective negative voltage input of a next lower switch driver, said third negative auxiliary voltage being referenced to the respective common potential point of the next lower switch driver.

7. The inverter according to claim 6, wherein the inverter is configured to perform a startup sequence to provide auxiliary voltages to the respective auxiliary voltage inputs of the switch drivers by turning the power semiconductor switches sequentially on and off in order from a lowest semiconductor switch to an upmost semiconductor and back to the lowest semiconductor switch in the series-connection.

8. The inverter according to claim 5, wherein:
the first bootstrap circuitry comprises a first diode, which includes an anode that is operationally connected to the first positive auxiliary voltage referenced to the negative voltage busbar, and a cathode that is operationally connected to the respective positive auxiliary voltage input of the second lowest switch driver; and
the second bootstrap circuitry comprises a second diode, which includes an anode that is operationally connected to the respective negative auxiliary voltage input of the upmost switch driver and a cathode which is operationally connected to the first negative auxiliary voltage referenced to the positive busbar.

9. The inverter according to claim 5, wherein the third bootstrap circuitry is configured to provide for several switch drivers, not including a respective additional negative auxiliary voltage from the negative auxiliary voltage of a next upper switch driver, and wherein each additional negative auxiliary voltage is referenced to the common potential point of the respective switch driver.

10. The inverter according to claim 9, wherein the third bootstrap circuitry comprises for several switch drivers, not including said upmost switch driver, a respective bootstrap diode having an anode operationally connected to the respective negative auxiliary voltage input of the switch driver and a cathode operationally connected to the respective negative auxiliary voltage input of the next upper switch driver.

11. The inverter according to claim 5, wherein the second bootstrap circuitry is configured to provide for several switch drivers, not including said lowest and second lowest switch drivers, a respective additional positive auxiliary voltage from the positive auxiliary voltage of a next lower switch and driver, wherein each additional positive auxiliary voltage is referenced to the common potential point of the respective switch driver.

12. The inverter according to claim 5, comprising a supply of at least one additional positive auxiliary voltage referenced to the negative voltage busbar and provided to the positive auxiliary voltage input of at least one other switch driver to be referenced to the common potential point of a respective switch driver, and wherein the second bootstrap circuitry is configured to provide for the at least one other of the switch drivers, a respective additional positive auxiliary voltage from a positive auxiliary voltage of a next lower switch driver, each additional positive auxiliary voltage being referenced to the common potential point of the respective switch driver.

13. The inverter according to according claim 5, comprising a supply of at least one additional negative auxiliary voltage referenced to the positive voltage busbar and provided at the negative auxiliary voltage input of at least one other switch driver to be referenced to the common potential point of a respective switch driver, and wherein the second bootstrap circuitry is configured to provide for the at least one other switch drivers a respective additional negative auxiliary voltage from a negative auxiliary voltage of a next upper switch driver, each additional negative auxiliary voltage being referenced to the common potential point of the respective switch driver.

14. The inverter according to claim 2, wherein the inverter is configured to perform a startup sequence to provide auxiliary voltages to the auxiliary voltage inputs of the switch drivers by turning the power semiconductor switches sequentially on and off.

15. The inverter according to claim 2, wherein the inverter comprises at least one series-connection of semiconductor switches and a respective control circuit for one or more phases of an output voltage.

16. A control circuit arranged to control series-connected semiconductor switches, comprising:
   a first bootstrap circuit configured to provide from a first negative auxiliary voltage supply a second negative auxiliary to a first switch driver of a first semiconductor switch; and
   a second bootstrap circuit configured to provide from the second negative auxiliary voltage supply a third negative auxiliary voltage to a second switch driver of a second semiconductor switch, said second negative auxiliary voltage is referenced to a common potential of the second switch driver.

17. The control set of claim 16 comprising:
   a third bootstrap set configured to provide from a first positive auxiliary voltage supply a second positive auxiliary voltage to a third such driver of a third semiconductor switch.

18. The control set of claim 17, wherein said second positive auxiliary voltage is referenced to a common potential of the third switch driver.

19. The control set of claim 16 wherein said second negative auxiliary voltage is referenced to a common potential of the first switch driver.

* * * * *